US012022263B2

(12) United States Patent
Polinske et al.

(10) Patent No.: US 12,022,263 B2
(45) **Date of Patent: *Jun. 25, 2024**

(54) RADIO FREQUENCY ANTENNA FOR AN IN-THE-EAR HEARING DEVICE

(71) Applicant: Starkey Laboratories, Inc., Eden Prairie, MN (US)

(72) Inventors: Beau Jay Polinske, Minneapolis, MN (US); Jay Rabel, Shorewood, MN (US); Randy Kannas, Minneapolis, MN (US); Deepak Pai Hosadurga, Bloomington, MN (US); Zhenchao Yang, Eden Prairie, MN (US); Jay Stewart, Eden Prairie, MN (US); Michael J. Tadeusiak, Minneapolis, MN (US); Stephen Paul Flood, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,995

(22) Filed: Sep. 21, 2022

(65) Prior Publication Data

US 2023/0156414 A1 May 18, 2023

Related U.S. Application Data

(63) Continuation of application No. 16/900,529, filed on Jun. 12, 2020, now Pat. No. 11,470,430, which is a (Continued)

(51) Int. Cl.
*H01Q 1/36* (2006.01)
*H04R 25/00* (2006.01)

(52) U.S. Cl.
CPC ......... *H04R 25/554* (2013.01); *H04R 25/602* (2013.01); *H04R 25/558* (2013.01);
(Continued)

(58) Field of Classification Search
CPC ........ H01Q 1/273; H01Q 9/0457; H01Q 9/24; H01Q 1/36; H01Q 1/243; H01Q 1/245;
(Continued)

(56) References Cited

U.S. PATENT DOCUMENTS

| | | | |
|---|---|---|---|
| 5,390,254 | A | 2/1995 | Adelman |
| 5,721,783 | A | 2/1998 | Anderson |

(Continued)

FOREIGN PATENT DOCUMENTS

| | | | |
|---|---|---|---|
| CN | 201378626 Y | 1/2010 | |
| EP | 1531649 A2 | 5/2005 | |
| EP | 2546926 A1 | 1/2013 | |

OTHER PUBLICATIONS

"U.S. Appl. No. 15/272,012, Non Final Office Action dated Aug. 15, 2017", 11 pgs.

(Continued)

*Primary Examiner* — Gerald Gauthier
(74) *Attorney, Agent, or Firm* — Schwegman Lundberg & Woessner, P.A.

(57) ABSTRACT

Disclosed herein, among other things, are systems and methods for a hearing device antenna. One aspect of the present subject matter includes a hearing device configured to be worn in an ear of a wearer to perform wireless communication. The hearing device includes a housing, hearing electronics within the housing, and an inverted F antenna or loop antenna disposed at least partially in the housing and configured for performing 2.4 GHz wireless communication. In various embodiments, at least a portion of the antenna protrudes from an exterior of the housing.

20 Claims, 8 Drawing Sheets

Related U.S. Application Data continuation of application No. 16/058,346, filed on Aug. 8, 2018, now Pat. No. 10,687,156, which is a continuation of application No. 15/272,012, filed on Sep. 21, 2016, now Pat. No. 10,051,388.

(52) U.S. Cl.
CPC .... *H04R 2225/025* (2013.01); *H04R 2225/31* (2013.01); *H04R 2225/33* (2013.01); *H04R 2225/51* (2013.01); *H04R 2460/17* (2013.01)

(58) Field of Classification Search
CPC ........ H01Q 5/371; H01Q 9/0421; H01Q 9/30; H01Q 9/40; H01Q 9/42; H01Q 11/10; H01Q 13/106; H02J 7/00; H04R 25/554; H04R 25/558; H04R 25/60; H04R 25/602; H04R 2225/025; H04R 2225/31; H04R 2225/33; H04R 2225/51; H04R 2460/17; H04R 25/55; B21C 23/18; H04B 1/3833; H04M 1/72478
See application file for complete search history.

(56) References Cited

U.S. PATENT DOCUMENTS 5,892,483 A * 4/1999 Hayes .................. H04B 1/3833 343/702
6,095,820 A 8/2000 Luxon et al.
6,249,256 B1 6/2001 Luxon et al.
6,549,633 B1 4/2003 Westermann
7,010,137 B1 3/2006 Leedom et al.
7,130,437 B2 10/2006 Stonikas et al.
7,256,747 B2 8/2007 Victorian et al.
7,450,078 B2 * 11/2008 Knudsen ................ H01Q 1/273 343/702
7,454,027 B2 11/2008 Sorensen
7,520,851 B2 4/2009 Davis et al.
7,652,628 B2 1/2010 Zweers
7,787,647 B2 8/2010 Hagen et al.
8,208,642 B2 6/2012 Edwards
8,649,540 B2 2/2014 Killion et al.
8,669,905 B2 * 3/2014 Hillersborg .......... H01Q 9/0457 343/702
8,699,733 B2 4/2014 Polinske et al.
8,737,658 B2 5/2014 Helgeson et al.
8,878,735 B2 * 11/2014 Kvist ..................... H01Q 1/273 343/702
9,042,832 B2 5/2015 Gu
9,374,650 B2 6/2016 Bauman
9,401,756 B2 7/2016 Tran et al.
9,408,005 B2 8/2016 Jeppesen
9,432,780 B2 8/2016 Solum
9,554,219 B2 1/2017 Kvist
9,584,932 B2 2/2017 Zurbruegg et al.
9,609,443 B2 3/2017 Ruaro et al.
9,729,979 B2 * 8/2017 Özden .................. H04R 25/554
9,854,345 B2 12/2017 Briggs
9,854,369 B2 12/2017 Solum
9,877,122 B2 1/2018 Flaig
9,967,646 B2 * 5/2018 Hankey ..................... H02J 7/00
10,003,379 B2 6/2018 Flood et al.
10,051,386 B2 8/2018 Pinto et al.
10,051,388 B2 * 8/2018 Polinske .............. H04R 25/554
10,142,747 B2 11/2018 Helgeson et al.
10,212,682 B2 2/2019 Solum et al.
10,313,807 B2 * 6/2019 Henriksen .............. H01Q 1/273
10,321,245 B2 6/2019 Bauman et al.
10,390,150 B2 * 8/2019 Ozden .................... H01Q 1/245
10,425,749 B2 9/2019 Thaysen
10,595,138 B2 * 3/2020 Pinto .................... H04R 25/554
10,687,156 B2 * 6/2020 Polinske .............. H04R 25/602
10,743,116 B2 * 8/2020 Rabel ................... H04R 25/554
11,470,430 B2 * 10/2022 Polinske .............. H04R 25/554
2002/0044099 A1 * 4/2002 Yamamoto ........... H01Q 9/0457 343/789
2002/0058539 A1 * 5/2002 Underbrink ............ H01Q 1/245 455/575.7
2004/0028251 A1 2/2004 Kasztelan et al.
2004/0044382 A1 3/2004 Ibrahim
2005/0099341 A1 5/2005 Zhang et al.
2005/0100183 A1 5/2005 Ballisager et al.
2005/0153756 A1 * 7/2005 Sato ....................... H01Q 5/371 455/575.1
2005/0244024 A1 11/2005 Fischer et al.
2006/0097931 A1 * 5/2006 Kim ....................... H01Q 1/243 343/702
2006/0227989 A1 10/2006 Polinske
2007/0003088 A1 * 1/2007 Lehtola ............. H04M 1/72478 381/330
2007/0080878 A1 * 4/2007 McLean ............... H01Q 13/106 343/729
2007/0086610 A1 4/2007 Niederdrank
2007/0183613 A1 8/2007 Juneau et al.
2007/0229369 A1 10/2007 Platz
2008/0024383 A1 * 1/2008 Chiang .................. H01Q 11/10 343/895
2008/0025537 A1 1/2008 Ritter et al.
2008/0056520 A1 3/2008 Christensen et al.
2008/0056526 A1 3/2008 Dunn et al.
2008/0095387 A1 4/2008 Niederdrank et al.
2008/0111745 A1 * 5/2008 Takada ................. H01Q 9/0457 343/700 MS
2008/0165982 A1 * 7/2008 Hankey ................... B21C 23/18 381/74
2008/0211721 A1 * 9/2008 Ohba ..................... H01Q 1/243 343/702
2008/0299904 A1 12/2008 Yi et al.
2009/0040125 A1 * 2/2009 Azulay .................... H01Q 9/42 343/829
2009/0041285 A1 2/2009 Parkins et al.
2009/0102726 A1 * 4/2009 Imano .................. H01Q 9/0421 343/702
2009/0103765 A1 4/2009 Bruckhoff et al.
2009/0214064 A1 8/2009 Wu et al.
2009/0243944 A1 10/2009 Jung et al.
2009/0322627 A1 12/2009 Sato et al.
2010/0020994 A1 * 1/2010 Christensen ......... H04R 25/554 381/315
2010/0131090 A1 5/2010 Mcbagonluri et al.
2010/0149045 A1 6/2010 Kikuchi et al.
2010/0158291 A1 6/2010 Polinske et al.
2010/0158293 A1 6/2010 Polinske et al.
2010/0158294 A1 6/2010 Helgeson et al.
2010/0158295 A1 6/2010 Polinske et al.
2010/0171667 A1 7/2010 Knudsen
2010/0171676 A1 * 7/2010 Tani ......................... H01Q 1/36 343/803
2010/0321269 A1 12/2010 Ishibana et al.
2011/0012797 A1 * 1/2011 Tani ......................... H01Q 9/40 343/702
2011/0019830 A1 1/2011 Leibman et al.
2011/0022121 A1 1/2011 Meskins
2011/0074654 A1 * 3/2011 Su ............................ H01Q 9/42 343/905
2011/0228947 A1 9/2011 Killion et al.
2012/0038535 A1 * 2/2012 Kotaka .................... H01Q 9/42 343/846
2012/0087506 A1 4/2012 Ozden
2012/0093324 A1 4/2012 Sinasi
2012/0188134 A1 * 7/2012 Hotta ..................... H01Q 5/371 343/722
2012/0231732 A1 9/2012 Kerselaers
2013/0017786 A1 1/2013 Kvist et al.
2013/0076573 A1 3/2013 Rappoport et al.
2013/0106666 A1 * 5/2013 Shan ...................... H01Q 1/243 343/725
2013/0307738 A1 11/2013 Baba et al.
2013/0342407 A1 12/2013 Kvist et al.
2014/0010392 A1 1/2014 Kvist
2014/0010393 A1 1/2014 Kvist

(56) References Cited

U.S. PATENT DOCUMENTS

2014/0010394 A1* 1/2014 Kvist .................... H01Q 9/24
381/315
2014/0023216 A1 1/2014 Solum et al.
2014/0099902 A1 4/2014 Rofougaran et al.
2014/0140554 A1 5/2014 Ruaro
2014/0153755 A1 6/2014 Hug et al.
2014/0185848 A1 7/2014 Ozden et al.
2014/0226844 A1 8/2014 Kerselaers
2014/0285392 A1* 9/2014 Huang .................... H01Q 9/30
343/843
2014/0296687 A1 10/2014 Irazoqui et al.
2014/0354495 A1 12/2014 Yang
2014/0368389 A1 12/2014 Inamura et al.
2014/0369537 A1 12/2014 Pontoppidan et al.
2015/0131828 A1 5/2015 Kvist
2015/0131831 A1 5/2015 Akdeniz et al.
2015/0171505 A1 6/2015 Harel et al.
2015/0245148 A1 8/2015 Rasmussen et al.
2015/0281859 A1 10/2015 Fischer et al.
2015/0289062 A1 10/2015 Ungstrup et al.
2015/0289067 A1 10/2015 Riepenhoff
2015/0296312 A1 10/2015 Nikles et al.
2016/0036127 A1 2/2016 Desclos et al.
2016/0037270 A1 2/2016 Polinske et al.
2016/0049074 A1 2/2016 Shennib
2016/0050501 A1 2/2016 Pinto
2016/0050502 A1 2/2016 Kvist et al.
2016/0057550 A1 2/2016 Shennib
2016/0183016 A1 6/2016 So et al.
2016/0241973 A1* 8/2016 Murray ................ H04R 25/554
2016/0366525 A1 12/2016 Bodvarsson
2016/0373867 A1 12/2016 Ozden
2016/0381470 A1 12/2016 Henriksen et al.
2017/0013373 A1 1/2017 Tessendorf et al.
2017/0026762 A1 1/2017 Ruaro et al.
2017/0064466 A1 3/2017 Pooladian et al.
2017/0070801 A1 3/2017 Nguyen et al.
2017/0134870 A1 5/2017 Helgeson et al.
2017/0150278 A1* 5/2017 Ruaro .................... H04R 25/60
2017/0171676 A1 6/2017 Pinto et al.
2017/0188163 A1* 6/2017 Rabel ..................... H04R 25/55
2017/0195466 A1 7/2017 Chen
2017/0195771 A1 7/2017 Hung et al.
2017/0245040 A1* 8/2017 Hankey ..................... H02J 7/00
2018/0063657 A1 3/2018 Bergner et al.
2018/0084351 A1* 3/2018 Polinske .............. H04R 25/554
2018/0352345 A1 12/2018 Polinske et al.
2019/0052980 A1 2/2019 Troelsen et al.
2019/0116433 A1* 4/2019 Hesselballe ............ H01Q 1/273
2019/0215623 A1 7/2019 Bodvarsson
2020/0329319 A1 10/2020 Polinske et al.
2021/0243541 A1 8/2021 Ochsenbein et al.
2023/0156414 A1* 5/2023 Polinske .............. H04R 25/554
381/324
2023/0336928 A1* 10/2023 Borra ................... H04R 25/602

OTHER PUBLICATIONS

"U.S. Appl. No. 15/272,012, Non Final Office Action dated Dec. 13, 2017", 12 pgs.

"U.S. Appl. No. 15/272,012, Notice of Allowance dated Apr. 11, 2018", 10 pgs.

"U.S. Appl. No. 15/272,012, Response Filed Mar. 13, 2018 to Non Final Office Action dated Dec. 13, 2017", 6 pgs.

"U.S. Appl. No. 15/272,012, Response filed Nov. 14, 2017 to Non Final Office Action dated Aug. 15, 2017", 7 pgs.

"U.S. Appl. No. 16/058,346, Advisory Action dated Jan. 13, 2020", 2 pgs.

"U.S. Appl. No. 16/058,346, Final Office Action dated Oct. 24, 2019", 12 pgs.

"U.S. Appl. No. 16/058,346, Non Final Office Action dated May 31, 2019", 17 pgs.

"U.S. Appl. No. 16/058,346, Notice of Allowability dated Apr. 1, 2020", 2 pgs.

"U.S. Appl. No. 16/058,346, Notice of Allowance dated Feb. 7, 2020", 10 pgs.

"U.S. Appl. No. 16/058,346, Response filed Dec. 19, 2019 to Final Office Action dated Oct. 24, 2019", 7 pgs.

"U.S. Appl. No. 16/058,346, Response filed Aug. 30, 2019 to Non-Final Office Action dated May 31, 2019", 7 pgs.

"U.S. Appl. No. 16/900,529, Final Office Action dated Mar. 18, 2022", 15 pgs.

"U.S. Appl. No. 16/900,529, Non Final Office Action dated Oct. 12, 2021", 17 pgs.

"U.S. Appl. No. 16/900,529, Notice of Allowance dated Jun. 2, 2022", 9 pgs.

"U.S. Appl. No. 16/900,529, Response filed Jan. 12, 2022 to Non Final Office Action dated Oct. 12, 2021", 8 pgs.

"U.S. Appl. No. 16/900,529, Response filed May 17, 2022 to Final Office Action dated Mar. 18, 2022", 8 pgs.

Huang, Yi, et al., "Antennas from Theory to Practice", John Wiley & Sons Ltd, The Atrium, Southern Gate, Chichester, West Sussex, PO19 8SQ, United Kingdom, (2008), 379 pgs.

U.S. Appl. No. 15/272,012 U.S. Pat. No. 10,051,388, filed Sep. 21, 2016, Radio Frequency Antenna for an in-the-Ear Hearing Device.

U.S. Appl. No. 16/058,346 U.S. Pat. No. 10,687,156, filed Aug. 8, 2018, Radio Frequency Antenna for an in-the-Ear Hearing Device.

U.S. Appl. No. 16/900,529 U.S. Pat. No. 11,470,430, filed Jun. 12, 2020, Radio Frequency Antenna for an in-the-Ear Hearing Device.

* cited by examiner

RADIO FREQUENCY ANTENNA FOR AN IN-THE-EAR HEARING DEVICE

CROSS-REFERENCE TO RELATED APPLICATION

This application is a continuation of U.S. patent application Ser. No. 16/900,529, filed Jun. 12, 2020, which is a continuation of U.S. patent application Ser. No. 16/058,346, filed Aug. 8, 2018, now issued as U.S. Pat. No. 10,687,156, which is a continuation of U.S. patent application Ser. No. 15/272,012, filed Sep. 21, 2016, now issued as U.S. Pat. No. 10,051,388, which is incorporated by reference herein in its entirety.

TECHNICAL FIELD

This document relates generally to hearing systems and more particularly to a radio frequency (RE) antenna for a hearing device.

BACKGROUND

Modern hearing devices, such as hearing assistance devices, are electronic instruments worn in or around the ear. Hearing aids are one example of hearing assistance devices that compensate for hearing losses of hearing-impaired people by specially amplifying sounds. The sounds may be detected from a wearer's environment using a microphone in a hearing aid and/or received from a streaming device via a wireless link. Wireless communication may also be performed for programming the hearing aid, for receiving information from the hearing aid, or for ear-to-ear communications such as data transfer. Wearers generally prefer that their hearing devices are minimally visible or invisible, do not interfere with their daily activities, and are easy to maintain. The hearing devices may each include an antenna for the wireless communication.

Accordingly, there is a need in the art for improved systems and methods for hearing device antennas.

SUMMARY

Disclosed herein, among other things, are systems and methods for a hearing device antenna. One aspect of the present subject matter includes a hearing device configured to be worn in an ear of a wearer to perform wireless communication. The hearing device includes a housing, hearing electronics within the housing, and an inverted F antenna disposed at least partially in the housing and configured for performing 2.4 GHz wireless communication, the antenna having a single ended structure and including a shunt connected to a battery for tuning impedance of the antenna. In various embodiments, at least a portion of the antenna protrudes from an exterior of the housing.

Another aspect of the present subject matter includes a method for providing a hearing device with a housing and having hearing electronics within the housing, the hearing device with capability for wireless communication. The method includes providing an inverted F antenna disposed at least partially in the housing and configured for performing 2.4 GHz wireless communication, the antenna having a single ended structure and including a shunt connected to a battery for tuning impedance of the antenna. In various embodiments, the housing includes a faceplate and a removal string connected to the housing and protruding through an exterior surface of the faceplate, and at least a portion of the antenna is configured to be affixed to the removal string.

A further aspect of the present subject matter includes a hearing device configured to be worn in an ear of a wearer to perform wireless communication. The hearing device includes a housing, hearing electronics within the housing, and a loop antenna disposed at least partially in the housing and configured for performing 2.4 GHz wireless communication, including a looped portion of the antenna protruding from a surface of the housing.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
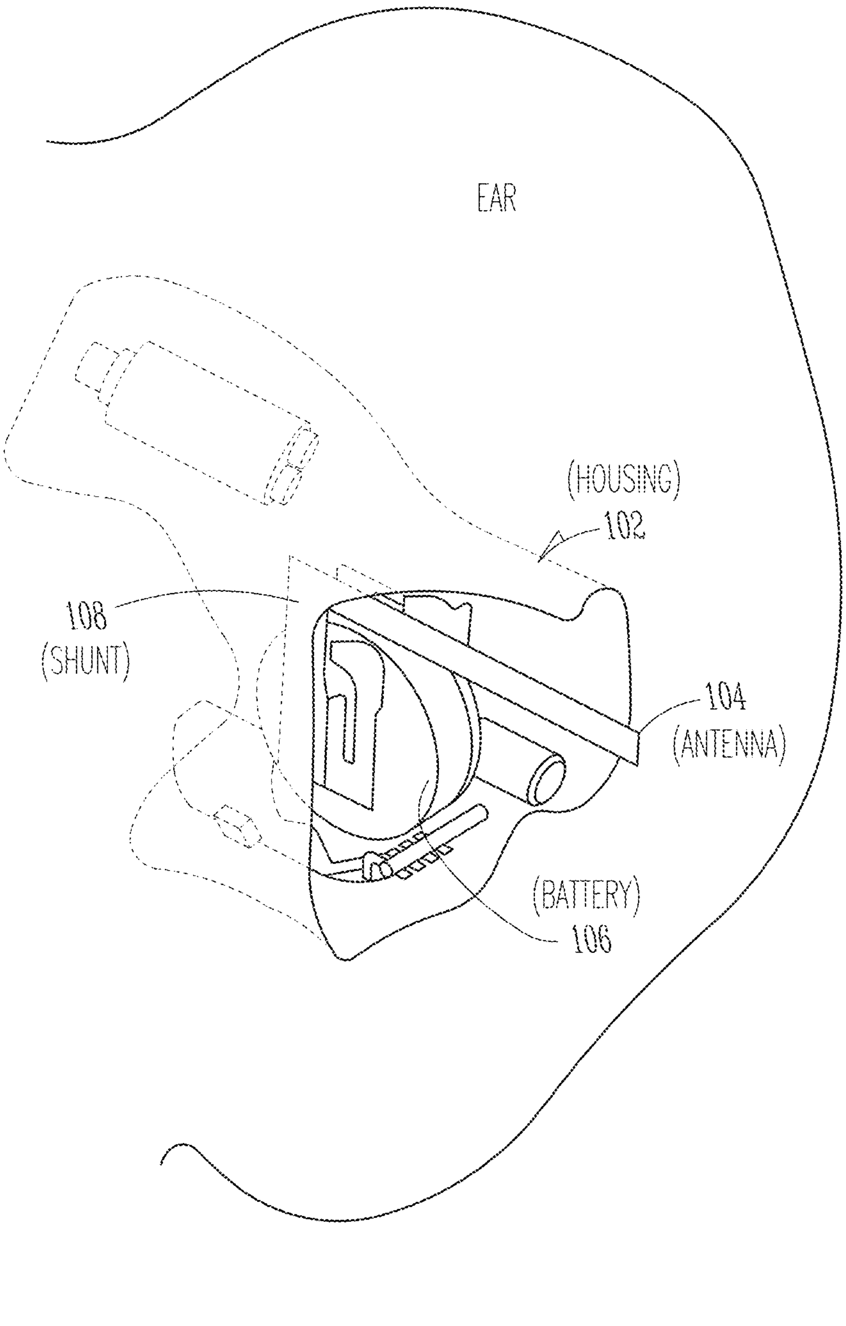
FIG. 1 illustrates a side view of a housing with an inverted F antenna for a hearing assistance device, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing devices using the example of hearing assistance devices such as hearing aids. Hearing aids are only one type of hearing device. Other hearing devices include, but are not limited to, those in this document. It is understood that their use in the description is intended to demonstrate the present subject matter, but not in a limited or exclusive or exhaustive sense.

Custom in-the-ear (ITE) hearing devices have limited space to place an antenna. The length of a 2.4 GHz quarter wave in free space is approximately 31 millimeters, which is larger than the length of most hearing devices on their own. In addition, placement of an antenna deep in the ear causes head and/or body loading of the antenna. Thus, most current antennas implemented in this area are limited to approximately −20 dB antenna efficiencies. Therefore, there is a need in the art for improved systems and methods for hearing device antennas for 2.4 GHz communication.

Disclosed herein, among other things, are systems and methods for a hearing device antenna. One aspect of the present subject matter includes a hearing device configured to be worn in an ear of a wearer to perform wireless communication. The hearing device includes a housing, hearing electronics within the housing, and an inverted F antenna disposed at least partially in the housing and configured for performing 2.4 GHz wireless communication, the antenna having a single ended structure and including a shunt connected to a battery for tuning impedance of the antenna. In various embodiments, at least a portion of the antenna protrudes from an exterior of the housing.

An inverted F antenna provides improved antenna efficiency compared to most other antennas currently used in hearing devices. The inverted F antenna of the present subject matter has an efficiency of approximately −12 dB, which is at least 8 dB better than other current solutions. In various embodiments, the antenna of the present subject matter is a single ended structure having a shunt leg tied to the battery for tuning the impedance. The antenna can be part of the lead frame which makes up the battery contacts, in various embodiments. In various embodiments, the radio circuit connects with the antenna and the battery terminal at the faceplate plane inside the shell. The antenna can extend out of the hearing device housing and be affixed alongside the removal string, in various embodiments. In various embodiments, the antenna creates an electric field perpendicular to the head of the wearer which improves the ear-to-ear communication link.

The inverted F antenna of the present subject matter uses vacant space where the hearing assistance circuit is not located, in various embodiments. In addition, the antenna can be extended out of the faceplate and be placed next to a pull string or could be embedded in the faceplate, in various embodiments. The inverted F antenna avoids mechanical interference during assembly and provides an increased antenna efficiency to improve all communication links with the hearing device, in various embodiments.

In various embodiments, the inverted F antenna includes a leg embedded in the faceplate rather than sticking out of it. The antenna leg is embedded in the battery drawer, in an embodiment. In various embodiments, the antenna leg is made of wire instead of stamped metal. The inverted F antenna is integrated in the battery contact of a custom faceplate, in an embodiment. According to various embodiments, the antenna leg sticks out of (or protrudes from) the faceplate perpendicular to the faceplate to optimize ear to ear communication. Other protrusion angles can be used without departing from the scope of the present subject matter. In one embodiment, an antenna leg is embedded in the faceplate to hide the antenna from the environment. In various embodiments, the antenna leg can be fastened to the removal string. The antenna is embedded in the battery drawer, in various embodiments. In various embodiments, the faceplate or housing includes a sport lock, and a portion of the antenna is included in a portion of the sport lock. In various embodiments, the antenna includes a small diameter wire protruding from the housing or faceplate, such as a nickel-titanium (Nitinol) wire, which in some embodiments can be plated using silver, copper or gold to improve conductivity, antenna performance, and aesthetics. Other types of wire and plating materials can be used without departing from the scope of the present subject matter.

FIG. 1 illustrates a side view of a housing 102 with an inverted F antenna 104 for a hearing device, according to various embodiments of the present subject matter. The hearing device is configured to be worn in an ear of a wearer to perform wireless communication. The hearing device includes a housing 102, and an inverted F antenna 104 disposed at least partially in the housing and configured for performing 2.4 GHz wireless communication. According to various embodiments, the antenna 104 has a single ended structure and includes a shunt 108 connected to a battery 106 for tuning impedance of the antenna. In various embodiments, at least a portion of the antenna protrudes from an exterior of the housing, and/or from a faceplate connected to the housing. The portion of the antenna protrudes approximately perpendicularly from the faceplate, in an embodiment.

According to various embodiments, the device includes a faceplate connected to the housing, and the antenna includes a portion embedded in the faceplate. The faceplate includes a battery contact, and the antenna is integrated in the battery contact in various embodiments. According to various embodiments, the housing includes a removal string, and a portion of the antenna that protrudes from the faceplate is configured to attach to the removal string. The hearing device housing includes a battery drawer configured to contain the battery, and the antenna includes a portion embedded in the battery drawer in various embodiments. The antenna includes a wire and/or stamped metal portion, in various embodiments.

Another aspect of the present subject matter includes a method for providing a hearing device with a housing, the hearing assistance device with capability for wireless communication. The method includes providing heating electronics within the housing and providing an inverted F antenna disposed at least partially in the housing and configured for performing 2.4 GHz wireless communication, and the antenna has a single ended structure and includes a shunt connected to a battery for tuning impedance of the antenna According to various embodiments, the method includes providing a faceplate of the housing and a radio circuit in the housing, and at least a portion of the antenna is configured to connect to the radio circuit at the faceplate. In various embodiments, providing a hearing device includes providing a custom in-the-ear (ITE) heating aid. The method further includes providing a sport lock on the housing, and the antenna includes a portion integrated with the sport lock, in various embodiments.

Figure 2:
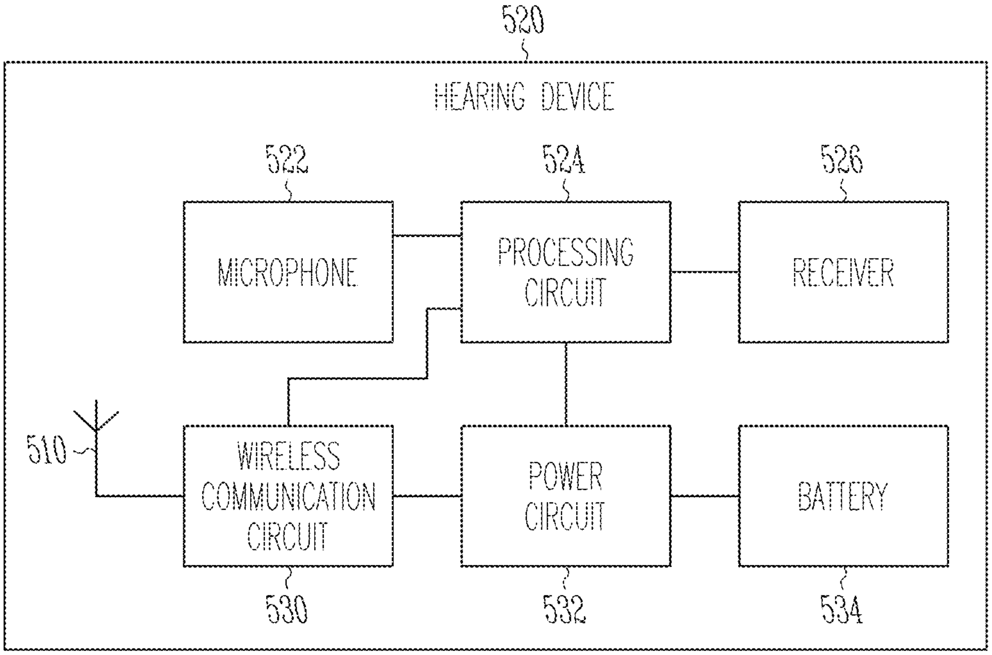
FIG. 2 is a block diagram illustrating an exemplary embodiment of a hearing device.

FIG. 2 is a block diagram illustrating an exemplary embodiment of a hearing device 520. Hearing device 520 includes a microphone 522, a wireless communication circuit 530, an antenna 510, a processing circuit 524, a receiver (speaker) 526, a battery 534, and a power circuit 532. Microphone 522 receives sounds from the environment of the hearing device wearer. Communication circuit 530 communicates with another device wirelessly using antenna 510, including receiving programming codes, streamed audio signals, and/or other audio signals and transmitting programming codes, audio signals, and/or other signals. Examples of the other device includes the other hearing aid of a pair of hearing aids for the same wearer, a hearing aid host device, an audio streaming device, a telephone, and other devices capable of communicating with hearing aids wirelessly. Processing circuit 524 controls the operation of hearing device 520 using the programming codes and processes the sounds received by microphone 522 and/or the audio signals received by wireless communication circuit 530 to produce output sounds. Receiver 526 transmits output sounds to an ear canal of the hearing aid wearer. Battery 534 and power circuit 532 constitute the power source for the operation of hearing aid circuit 520. In various embodiments, power circuit 532 can include a power management circuit. In various embodiments, battery 534 can include a rechargeable battery, and power circuit 532 can include a recharging circuit for recharging the rechargeable battery. In various embodiments, antenna 510 includes an inverted F antenna of the present subject matter. The antenna protrudes from the housing or faceplate in various embodiments (as shown in FIG. 3).

Figure 3:
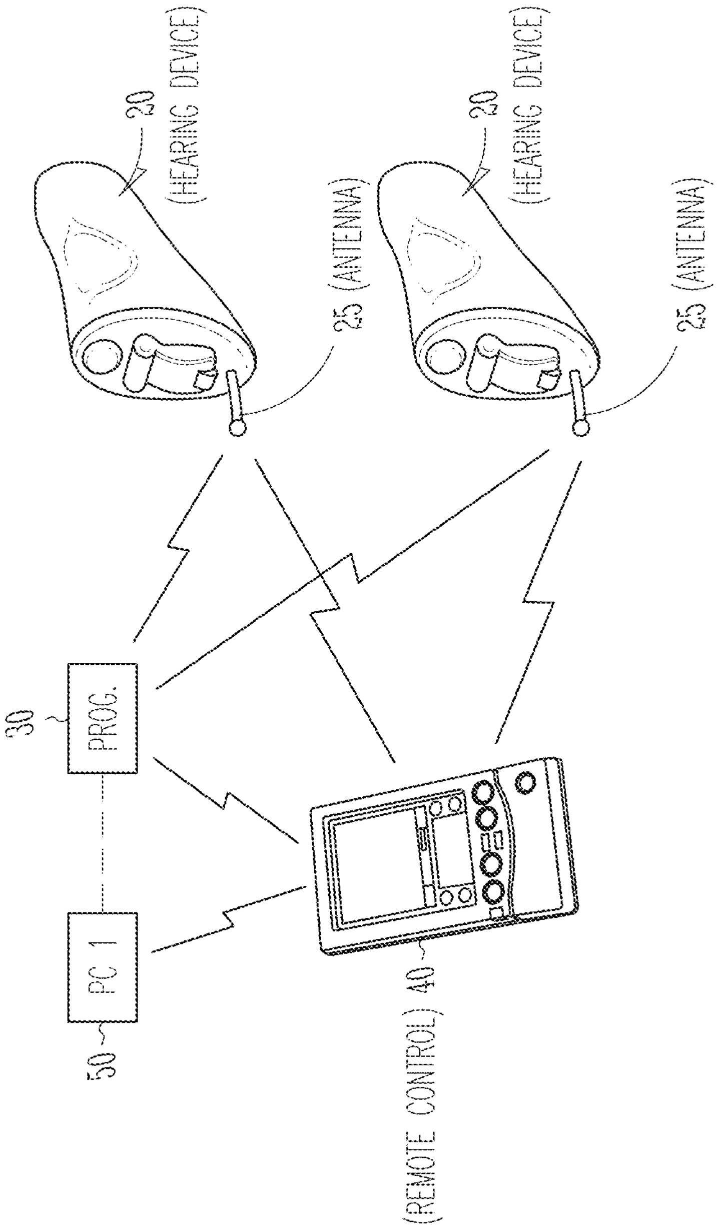
FIG. 3 illustrates a block diagram of a wireless system for fitting hearing assistance devices for a wearer, according to various embodiments of the present subject matter.

FIG. 3 illustrates a block diagram of a wireless system for fitting hearing assistance devices 20 for a wearer, according to various embodiments of the present subject matter. This system depicts an example of one of many systems in which a wireless hearing device communicates wirelessly. A wireless hearing assistance device programmer 30 configured to wirelessly communicate with a hearing assistance device 20 using at least one of a plurality of channels. The system may also include a host computer, such as PC 50, in communication with the wireless programmer. The PC 50 may be wired or wirelessly connected to the programmer 30, either directly or indirectly, in various embodiments. The wireless programmer 30 is configured to assist a user, such as an audiologist or other professional, in fitting the hearing assistance devices 20 for a wearer of the devices. A remote control device 40 can also be used, and is configured to communicate wired or wirelessly with the devices 20, the programmer 30, and/or the PC 50. The remote control device may include a mobile device, such as a smart phone, tablet or laptop, with an application running on the mobile device. In various embodiments, one or both of the hearing assistance devices 20 include an inverted F antenna 25 of the present subject matter, for use in radio frequency communications to assist in programming the hearing assistance device. Other types of wireless communication, such as streaming audio or other control functions, can be accomplished using the inverted F antenna 25, without departing from the scope of the present subject matter.

Figure 4:
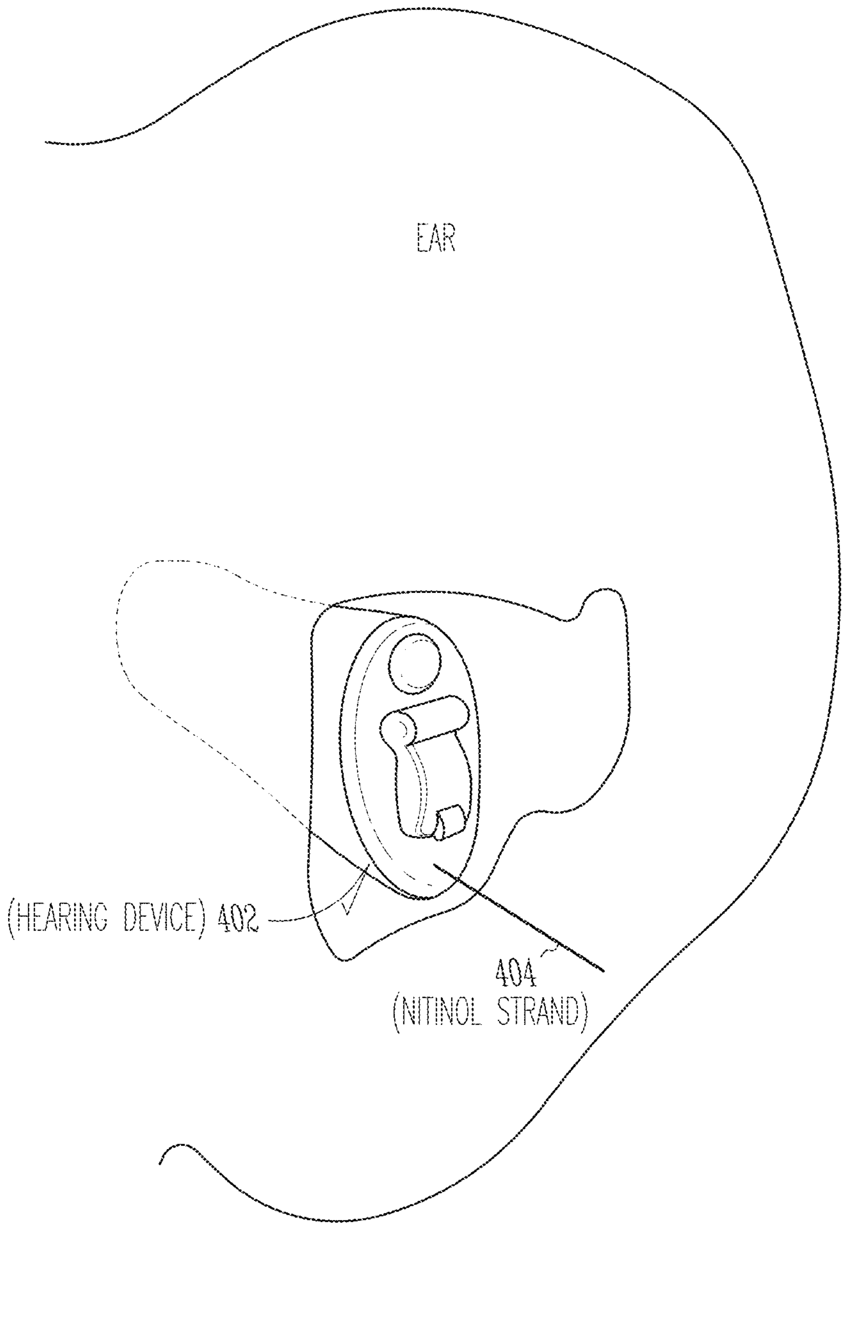
FIG. 4 illustrates a hearing device including an antenna having a Nitinol portion, according to various embodiments of the present subject matter.
Figure 5A:
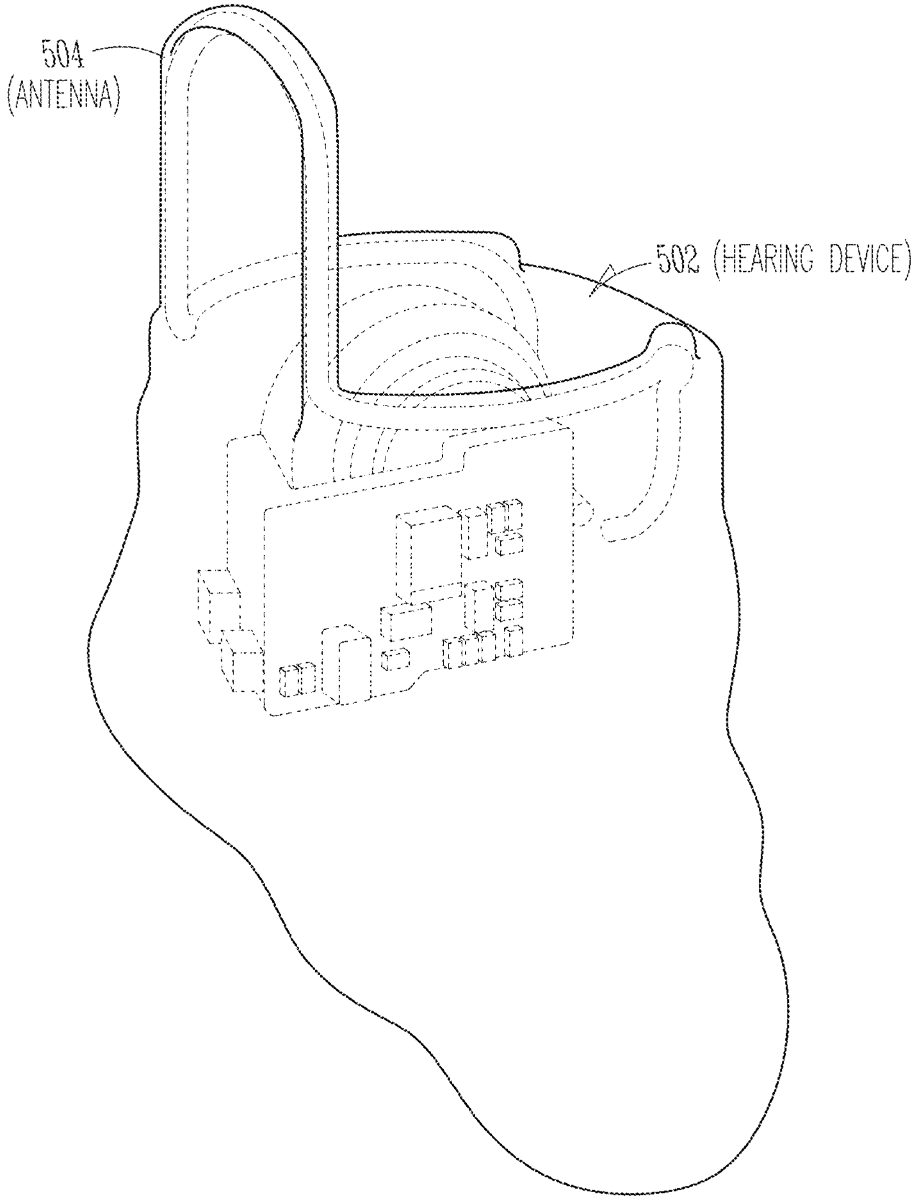
FIGS. 5A-5D illustrate hearing device including a partially external loop antenna in various orientations, according to various embodiments of the present subject matter.
Figure 5B:
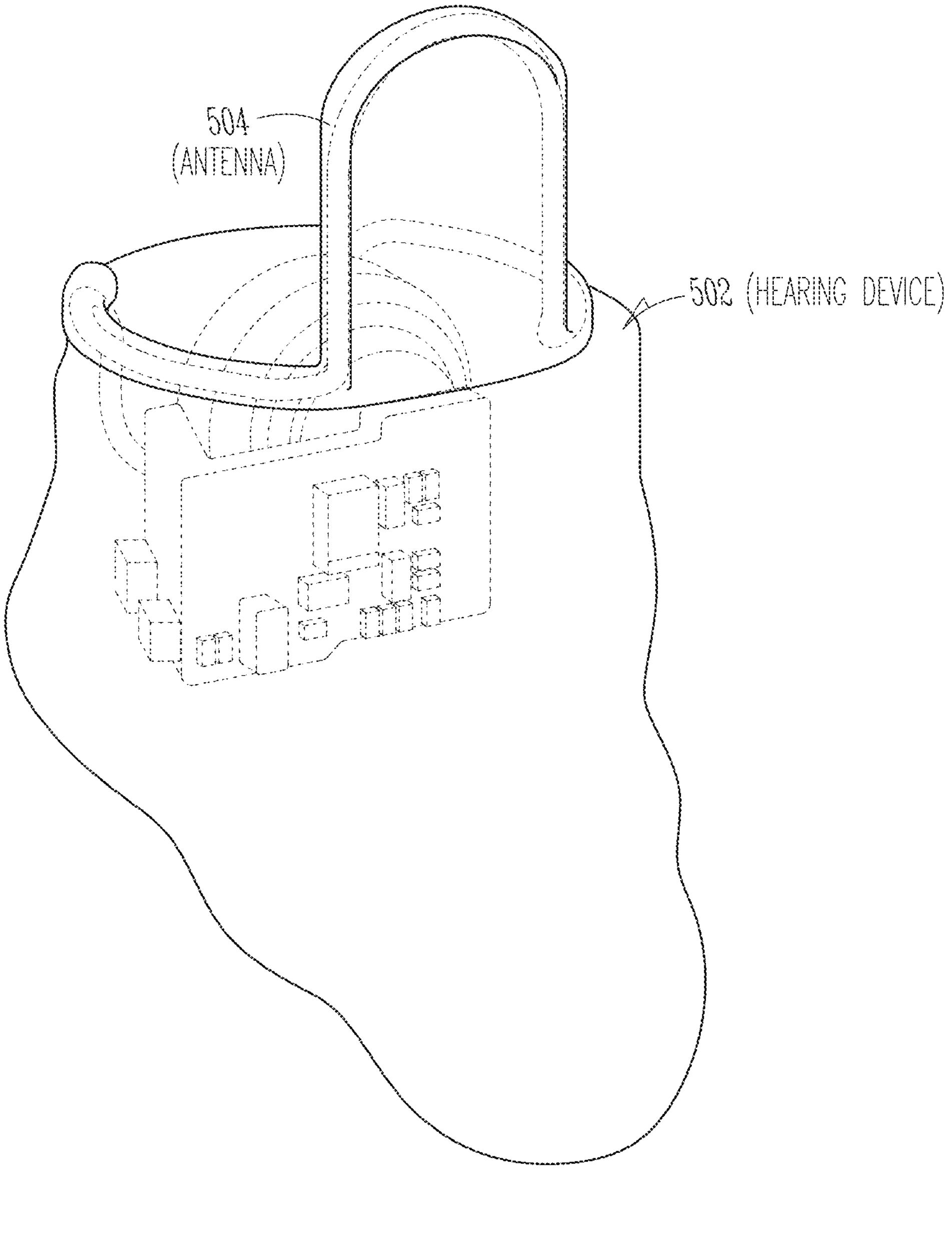
Figure 5C:
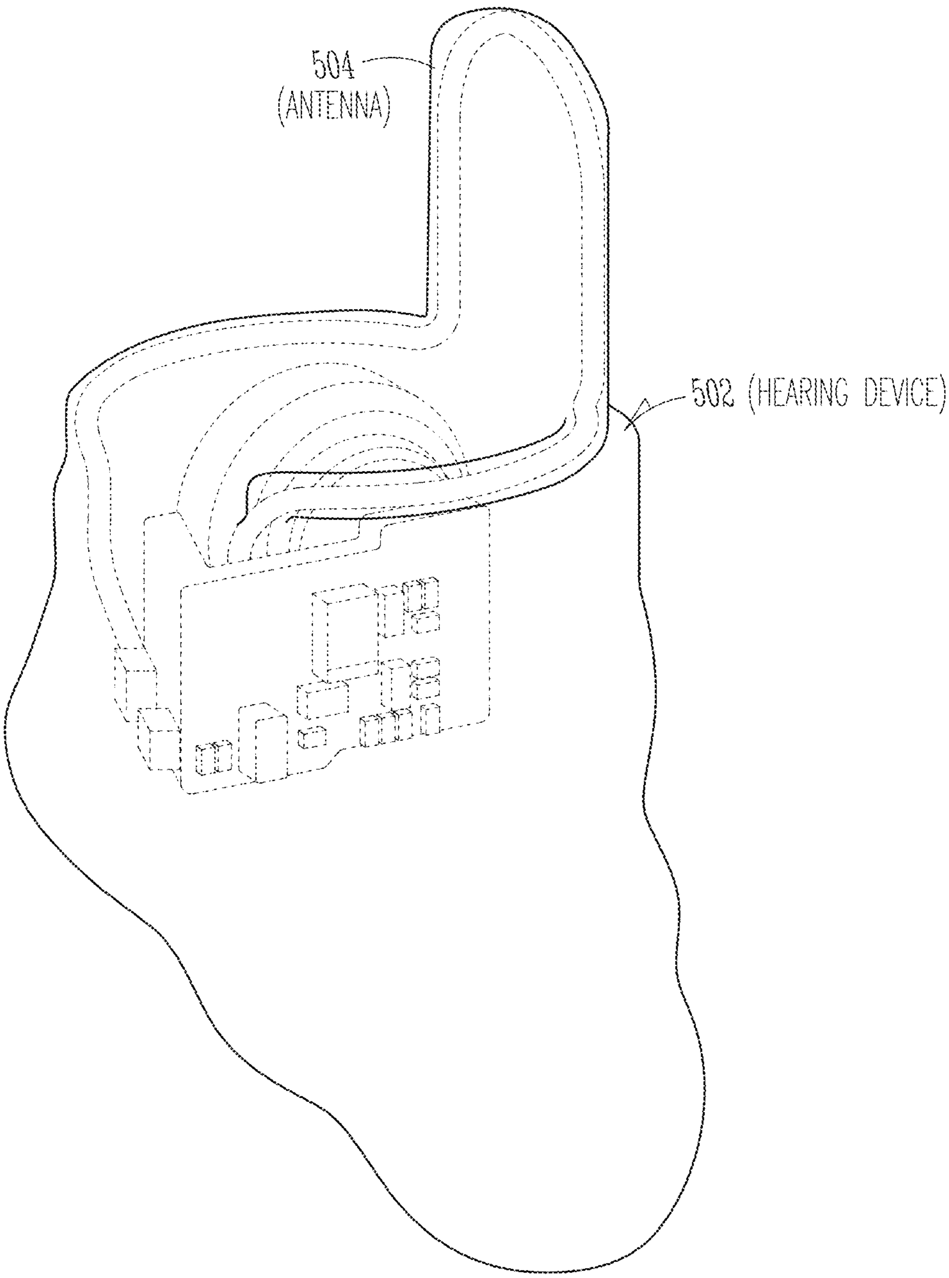
Figure 5D:
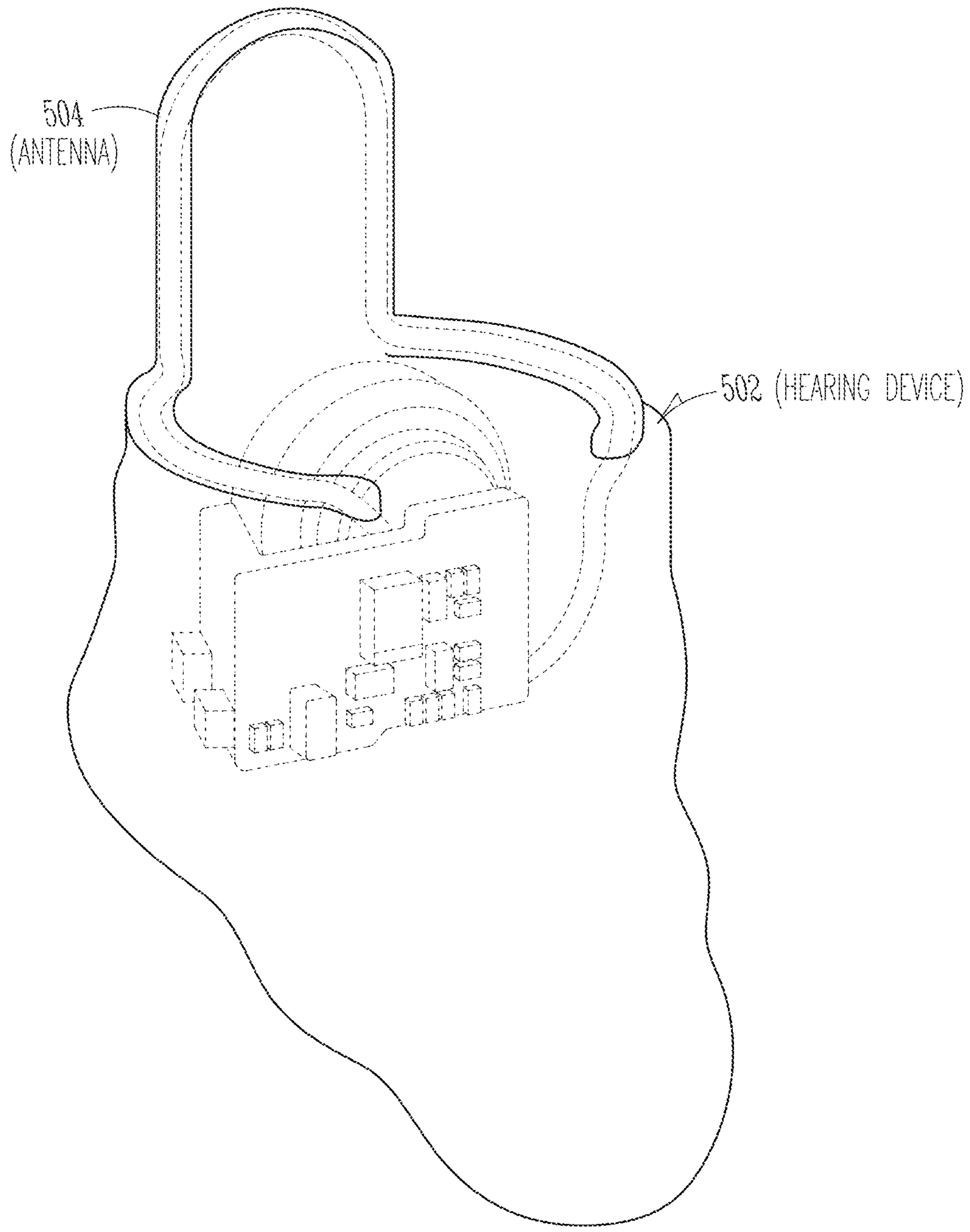

In various embodiments, the inverted F antenna includes a portion protruding from the faceplate or housing of the hearing device. In one aspect of the present subject matter, the portion protruding from the faceplate or housing is replaced with a Nitinol strand. Nitinol has unique mechanical properties, including superior strength, shape memory and super-elasticity, which can be used to provide a longer (more protrusion from the housing/faceplate) yet still aesthetically pleasing (thin and hair-like) antenna. FIG. 4 illustrates an embodiment of a hearing device 402 including an antenna of the present subject matter having a Nitinol portion 404 protruding from the device. In various embodiments, the Nitinol portion, or Nitinol strand, is formed by micro-welding the strand to the antenna to replace a copper portion extending from the housing or faceplate, to create a hybrid Nitinol-copper antenna. Nitinol is an extremely rigid material even at very small gauges. In one embodiment, the Nitinol portion of the antenna diameter is 0.005 inches and mimics a human hair. As a result, antenna length can be increased without sacrificing the aesthetic of the hearing device. In one embodiment, the Nitinol includes a 0.005 inch diameter wire. Increasing the length of the Nitinol strand to have approximately 30 mm protruding from the housing or faceplate (the optimum point from radiation performance wise) can improve the radiation efficiency by 35 times (15.4 dB). The hair-like profile of a Nitinol wire makes this length elongation much more realistic and acceptable than a common copper strip. In various embodiments, the Nitinol portion can be routed in different ways (internally or externally to the device housing) to allow increase in electrical length and realistic matching impedance. Where inside the faceplate, the antenna of the present subject matter uses space where the hearing circuit is not located. The Nitinol portion can be extended out of the faceplate and be placed next to a pull string or could be embedded in the faceplate with a little less efficiency, in various embodiments. The Nitinol strand avoids mechanical interference in the shell during assembly and an increases antenna efficiency to improve communication links. In various embodiments, the Nitinol strand can be used with any hearing device antenna, and is not limited to use with inverted F antennas.

A further aspect of the present subject matter includes a hearing device configured to be worn in an ear of a wearer to perform wireless communication. The hearing device includes a housing, hearing electronics within the housing, and a loop antenna disposed at least partially in the housing and configured for performing 2.4 GHz wireless communication. In various embodiments, a looped portion of the antenna protrudes from a surface of the housing. FIGS. 5A-5D illustrate hearing device 502 including a partially external loop antenna 504 in various orientations, including protruding from the left, right, front and back portions of the hearing device, according to various embodiments of the present subject matter. The perpendicular loop antenna 504 provides improved antenna efficiency for radio frequency communication. In various simulations, the efficiency of this antenna 504 was shown to be approximately −22 dB, which is 10 dB better than previous solutions. In various embodiments, the antenna includes a loop oriented perpendicularly (or substantially perpendicularly) to an external surface of the housing or a faceplate of housing, and partially extends beyond the external surface of the hearing device. In one embodiment, the antenna can be overmolded into the housing or faceplate. In various embodiments, the antenna can be part of the lead frame which makes up the battery contacts. In further embodiments, the antenna can extend out of the hearing device and may be part of a removal handle or string. The loop antenna creates an E-field perpendicular to the wearer's head, which improves an ear-to-ear communication link in various embodiments.

In various embodiments, the loop antenna 504 can be entirely embedded in the housing or faceplate, instead of partially protruding therefrom. The loop antenna 504 can be made of wire, stamped metal or other conductive materials, in various embodiments. In one embodiment, the loop antenna 504 can be provided within a canal lock. The loop antenna 504 of the present subject matter can be used in any in-ear device that uses an RE communication link. In various embodiments, the loop antenna is integrated into the lead frame of a custom faceplate. The loop antenna is overmolded within the plastic of a custom faceplate, in various embodiments. The antenna loop extends perpendicular to the faceplate or housing to optimize ear to ear communication, in an embodiment. The antenna is made of formed wire or stamped metal, in various embodiments. In various embodiments, the antenna loop can be used as part of a removal handle or string. The external area of antenna could be partially or completely overmolded in plastic to hide it, in various embodiments. In one embodiment, the external area of antenna can serve as part of a canal lock. Further embodiments use dielectrically loaded elements (for example, a chip antenna) in series with the loop antenna to electrically lengthen the antenna or physically shorten the antenna. In various embodiments, the loop antenna can be a dipole or folded monopole antenna. In further embodiments, the housing can be printed such that the loop antenna would be within the shell and not protruding from the shell. The loop antenna includes a nitinol wire (or gold plated nitinol wire) to reduce visibility of the antenna, in various embodiments. The loop antenna projects on the same plane internally to the housing and externally to the housing, in an embodiment. By providing the looped antenna portion externally to the housing and the ear of the wearer, body loading is decreased and effective antenna length is increased. In addition, by providing a looped antenna portion perpendicular (or substantially perpendicular) to the wearer's head, the resulting electric field is normal to the wearer's head and provides an improved communication network and ear-to-ear communication performance.

Various embodiments of the present subject matter support wireless communications with a hearing assistance device. In various embodiments the wireless communications can include standard or nonstandard communications. Some examples of standard wireless communications include link protocols including, but not limited to, Bluetooth™, IEEE 802.11(wireless LANs), 802.15 (WPANs), 802.16 (WiMAX), cellular protocols including, but not limited to CDMA and GSM, ZigBee, and ultra-wideband (MB) technologies. Such protocols support radio frequency communications and some support infrared communications. Although the present system is demonstrated as a radio system, it is possible that other forms of wireless communications can be used such as ultrasonic, optical, and others. It is understood that the standards which can be used. include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

It is understood that variations in combinations of components may be employed without departing from the scope of the present subject matter. Hearing assistance devices typically include an enclosure or housing, a microphone, hearing assistance device electronics including processing electronics, and a speaker or receiver. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that any hearing device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the user.

It is understood that the hearing aids referenced in this patent application. include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, audio decoding, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing devices, such as ear buds and hearing assistance devices, including hearing aids, including but not limited to, behind-the-ear (BTE), in-the-ear (ITE), in-the-canal (ITC), receiver-in-canal (RIC), invisible-in-canal (IIC) or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing devices generally, such as cochlear implant type hearing devices and such as deep insertion devices having a transducer, such as a receiver or microphone, whether custom fitted, standard, open fitted or occlusive fitted. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing device configured to be worn in an ear of a wearer to perform wireless communication, comprising:

a housing;

hearing electronics within the housing; and a folded monopole antenna connected to the hearing electronics and disposed partially in the housing, wherein an open-ended portion of the antenna protrudes from a surface of the housing, wherein the protruding portion includes a portion that is transverse to an outer surface of the housing.

2. The hearing device of claim 1, wherein the housing includes a faceplate and at least a portion of the folded monopole antenna is molded within the faceplate.

3. The hearing device of claim 1, wherein the protruding portion includes an elastic portion configured with shape memory.

4. The heating device of claim 3, wherein the elastic portion is micro-welded to the folded monopole antenna.

5. The hearing device of claim 1, wherein the protruding portion further includes a curved portion that bends around back toward the housing.

6. The hearing device of claim 5, wherein the protruding portion extends toward and through the surface of the housing.

7. The hearing device of claim 1, wherein an end of the folded monopole antenna is loaded with an element.

8. The hearing device of claim 7, wherein the element includes a dielectrically loaded element.

9. The hearing device of claim 1, wherein the protruding portion is configured for use as a pull handle to remove the hearing device from the ear of a wearer.

10. The hearing device of claim 1, wherein the folded monopole antenna includes a first end of the antenna and a second end of the antenna, the first end of the antenna being physically and electrically connected to a wireless communication circuit within the housing.

11. The hearing device of claim 10, wherein the housing includes a faceplate and the second end of the antenna extends through the faceplate.

12. A method of forming a hearing device configured to be worn in an ear of a wearer to perform wireless communication, the method comprising:

providing a folded monopole antenna connected to hearing electronics within a housing of the heating device, the folded monopole antenna disposed partially in the housing, wherein an open-ended portion of the antenna protrudes from a surface of the housing, wherein the open-ended portion includes a portion that is transverse to the surface of the housing.

13. The method of claim 12, further comprising:

providing at least a portion of the folded monopole antenna molded within a faceplate of the housing.

14. The method of claim 12, further comprising:

providing at least a portion of the folded monopole antenna including an elastic portion configured with shape memory.

15. The method of claim 14, wherein the elastic portion includes Nitinol.

16. The method of claim 14, wherein the elastic portion is micro-welded to the folded monopole antenna.

17. The method of claim 12, further comprising:

providing the protruding portion including an arched portion that bends around back toward the housing.

18. The method of claim 12, wherein an end of the folded monopole antenna is loaded with an element in series with the folded monopole antenna.

19. The method of claim 18, wherein the element includes a dielectrically loaded element.

20. The method of claim 12, wherein the protruding portion is configured for use as a pull handle to remove the hearing device from the ear of a wearer.

* * * * *